(12) United States Patent
Cohen et al.

(10) Patent No.: US 8,806,634 B2
(45) Date of Patent: Aug. 12, 2014

(54) SYSTEM FOR FINDING POTENTIAL ORIGINS OF SPOOFED INTERNET PROTOCOL ATTACK TRAFFIC

(76) Inventors: Donald N. Cohen, Los Angeles, CA (US); Krishnamurthy Narayanaswamy, Los Angeles, CA (US)

(*) Notice: Subject to any disclaimer, the term of this patent is extended or adjusted under 35 U.S.C. 154(b) by 169 days.

(21) Appl. No.: 13/360,153

(22) Filed: Jan. 27, 2012

(65) Prior Publication Data

US 2013/0028259 A1    Jan. 31, 2013

Related U.S. Application Data

(63) Continuation-in-part of application No. 11/099,181, filed on Apr. 5, 2005, now abandoned.

(51) Int. Cl.
*G06F 11/00* (2006.01)

(52) U.S. Cl.
USPC .............................................................. 726/23

(58) Field of Classification Search
USPC ........................................ 726/11–14, 22–24
See application file for complete search history.

(56) References Cited

U.S. PATENT DOCUMENTS

| | | | |
|---|---|---|---|
| 5,727,146 A | 3/1998 | Savoldi et al. | |
| 5,793,763 A | 8/1998 | Mayes et al. | |
| 5,796,942 A | 8/1998 | Esbensen | |
| 5,798,706 A | 8/1998 | Kraemer et al. | |
| 5,991,881 A | 11/1999 | Conklin et al. | |
| 6,088,804 A | 7/2000 | Hill et al. | |
| 6,215,772 B1 | 4/2001 | Verma | |
| 6,279,113 B1 | 8/2001 | Vaidya | |
| 6,301,668 B1 | 10/2001 | Gleichauf et al. | |
| 6,347,376 B1 | 2/2002 | Attwood et al. | |
| 6,415,321 B1 | 7/2002 | Gleichauf et al. | |
| 6,499,107 B1 | 12/2002 | Gleichauf et al. | |
| 6,505,192 B1 | 1/2003 | Godwin et al. | |
| 6,715,081 B1 | 3/2004 | Attwood et al. | |
| 6,754,832 B1 | 6/2004 | Godwin et al. | |
| 6,816,973 B1 | 11/2004 | Gleichauf et al. | |
| 6,822,971 B1 | 11/2004 | Mikkonen | |
| 6,981,158 B1 | 12/2005 | Sanchez et al. | |
| 7,200,105 B1 * | 4/2007 | Milliken et al. | 370/216 |
| 7,302,705 B1 * | 11/2007 | Boivie | 726/22 |
| 7,814,546 B1 | 10/2010 | Strayer et al. | |
| 8,281,400 B1 * | 10/2012 | Eater et al. | 726/25 |
| 2002/0032793 A1 * | 3/2002 | Malan et al. | 709/232 |
| 2002/0165957 A1 | 11/2002 | Devoe et al. | |

(Continued)

*Primary Examiner* — Darren B Schwartz
(74) *Attorney, Agent, or Firm* — David A. Belasco; Norton Townsley; Belasco Jacobs & Townsley, LLP

(57) ABSTRACT

The invention computes approximate origins of data packets transmitted over the Internet. Law enforcement agencies and network operators can use it to assign responsibility for observed Internet activities. The invention uses a small number of cooperative locations (incoming links on routers or switches) to provide link identification data: whether a packet or did or did not traverse that location. The system uses these cooperative places to generate the link signature of a data packet—which cooperative locations observed and did not observe the packet. Potential origin locations are divided into pre-computed blocks that have the same link signatures to given destination locations. The blocks are used to generate reverse routing data, potential source addresses for different link signatures. Variations of the invention store relevant link identification and reverse routing data to find the origins of past packets or to compute the origins of packets from partial information about packets of interest.

16 Claims, 4 Drawing Sheets

(56) References Cited

U.S. PATENT DOCUMENTS

| | | | |
|---|---|---|---|
| 2003/0009554 A1* | 1/2003 | Burch et al. ................. 709/224 |
| 2003/0097439 A1 | 5/2003 | Strayer et al. |
| 2003/0115485 A1 | 6/2003 | Milliken |
| 2003/0149777 A1* | 8/2003 | Adler ........................... 709/228 |
| 2003/0172289 A1* | 9/2003 | Soppera ........................ 713/200 |
| 2004/0093521 A1* | 5/2004 | Hamadeh et al. ............. 713/201 |
| 2005/0060562 A1* | 3/2005 | Bhattacharya et al. ....... 713/200 |
| 2005/0111447 A1* | 5/2005 | Soukup ......................... 370/389 |
| 2005/0132219 A1* | 6/2005 | Robert .......................... 713/201 |
| 2005/0278779 A1* | 12/2005 | Koppol et al. ................. 726/22 |
| 2006/0184690 A1* | 8/2006 | Milliken ....................... 709/238 |
| 2007/0157314 A1* | 7/2007 | Hong et al. .................... 726/23 |
| 2008/0071903 A1* | 3/2008 | Schuba et al. ................ 709/224 |
| 2008/0127324 A1* | 5/2008 | Seo et al. ....................... 726/13 |
| 2008/0244739 A1* | 10/2008 | Liu et al. ........................ 726/22 |
| 2008/0301810 A1* | 12/2008 | Lehane et al. ................. 726/23 |
| 2010/0212013 A1* | 8/2010 | Kim et al. ..................... 726/23 |

\* cited by examiner

LINK SIGNATURES FOR
IDENTIFIED DATA PACKETS

| DATA PACKET | COOPERATING LOCATIONS | | | |
|---|---|---|---|---|
| | $C_1$ | $C_2$ | $C_3$ | $C_4$ |
| $P_1$ | 0 | 1 | 1 | 0 |
| $P_2$ | 1 | 1 | 0 | 1 |
| $P_3$ | 1 | 1 | 1 | 0 |

LINK SIGNATURES

FIG. 2

TABLE OF ORIGINS — 40

| DATA PACKET | DESTINATION LOCATIONS | LINK SIGNATURES | ORIGIN LOCATIONS |
|---|---|---|---|
| $P_1$ | $D_1$ | 1 1 1 0 <br> 0 1 1 0 | $O_1$ <br> $O_2$ |
| $P_2$ | $D_1$ | 1 1 0 1 <br> 0 1 0 1 | $O_2$ <br> $O_1$ |
| $P_3$ | $D_1$ | 1 1 0 1 <br> 1 1 1 0 | $O_2$ <br> $O_2$ |

FIG. 3

TABLE OF ORIGINS FOR BLOCKS — 60, 40

| DATA PACKET | DESTINATION LOCATIONS | LINK SIGNATURES | ORIGIN LOCATIONS |
|---|---|---|---|
| $P_1$ | $B_1$ | 30 → 1 1 1 0<br>0 1 1 0 ← 35 } 50 | $B_2$ |
| | | 1 1 0 1 — 25 | |
| $P_2$ | $B_3$ | 1 1 0 1 | $B_4$ |
| $P_3$ | $B_6$ | 1 1 0 0<br>0 1 0 0 } 50 | $B_2$ |
| | | 25 | |

FIG. 4

REVERSE ROUTING TABLE — 75

| SOURCE | DESTINATION | | |
| | $B_1$ | $B_2$ | $B_{N'}$ |
|---|---|---|---|
| $B_1$ | | 0 1 0 1 | 1 1 1 0 |
| $B_2$ | 0 1 0 1 | 80 | 1 0 1 0 |
| $B_3$ | 1 1 0 0 | 1 0 1 1 | 0 1 1 1 |
| $B_N$ | 0 1 0 0 | 1 1 1 1 | |

SYSTEM FOR FINDING POTENTIAL ORIGINS OF SPOOFED INTERNET PROTOCOL ATTACK TRAFFIC

CROSS REFERENCE TO RELATED APPLICATION

This application is a Continuation-in-Part of U.S. patent application Ser. No. 11/099,181, filed Apr. 5, 2005 now abandoned.

FIELD OF INVENTION

The invention pertains to network data transmission monitoring. More particularly, the invention relates to systems for identifying the source of identified data packets based upon incomplete information regarding packet routing.

BACKGROUND OF THE INVENTION

Those who would mount attacks on Internet websites or addresses typically falsify the source addresses (origins) of the packets they send in their attacks. There is, therefore, a need for a reliable attribution method to identify the addresses of machines that might actually have originated an attack packet once it arrives at a victim site. As all the machines connected to a hub in a Local Area Network (LAN) may be indistinguishable from one another as the potential origins of a packet, we may be only able to determine a set of addresses that contain the actual origin. This result, however, may still be very useful to those attempting to track the origin of an identified data packet.

A packet is a basic unit of communication over a digital network. A packet is also called a datagram, a segment, a block, a cell or a frame, depending on the protocol. When data has to be transmitted, it is broken down into similar structures of data, which are reassembled to the original data chunk once they reach their destination.

Packets vary in structure depending on the protocols implementing them. VoIP uses the IP protocol, and hence IP packets. On an Ethernet network, for example, data is transmitted in Ethernet frames. The structure of a packet depends on the type of packet it is and on the protocol. Normally, a packet has a header and a payload. The header keeps overhead information about the packet, the service and other transmission-related things. For example, an IP packet includes The source IP address
The destination IP address
The sequence number of the packets
The type of service
Flags
The payload is the data it carries.

Most network data transmission technologies use packets to transmit data from a source device to destination. The IP protocol is no exception. IP packets are the most important and fundamental components of the protocol. The two main functions of the IP protocol are routing and addressing. To route packets to and from machines on a network, this protocol uses IP addresses which are carried along in the packets. A lot of other information is also carried along in the packet header. An identification tag is used to help reassemble the packet from several fragments, if the packet has been fragmented. The fragmented flag indicates whether the packet can be fragmented or not. The fragment offset is a field to identify which fragment this packet is attached to. Time to Live (TTL) is a number that indicates how many hops (router passes) the packet can make before it dies. This is done to prevent a packet from remaining forever on a network, thus causing congestion. TTL is decremented at each hop. The header checksum is a number used for error detection and correction during packet transmission. The data payload can be up to 64 Kilobytes, which is huge compared to the totality of the header bits.

A variation of this problem is to identify the IP packet from an incomplete description of its properties, and then find the true origin of that packet. This is a useful variation of the problem in practice because it may not always be reasonable to expect trackers to have the actual IP packet. It is far more likely that a tracker will know specific properties of the attack. For example, a tracker might be expected to know information such as the time of the attack, the IP address of the machine that was the victim, perhaps the port of the machine and the type of packet (protocol) involved. The present invention attempts to solve these problems by development of a series of cooperating information sources that can reliably report whether or not an identified data packet has passed through the source at a point in time. Various types of systems have been developed for identifying the origin of data streams under a variety of differing conditions, incorporating a number of different technologies.

U.S. Pat. No. 6,822,971 issued to Mikkonen discloses a module, and associated method, that is engageable with a data terminal. The module includes a storage element for storing an identifier address, used to identify the origin of a packet of data. The module can be released out of positioning at a first data terminal and thereafter utilized at a second data terminal. Thereby, mobility of communications is increased as a user of successive data terminals can identify each successive data terminal with the same identifier.

U.S. Pat. No. 5,798,706 issued to Kraemer et al. describes a back door packet communication between a workstation on a network and a device outside the network that is identified by detecting packets that are associated with communication involving devices outside the network, and identifying packets, among those detected packets, that are being sent or received by a device that is not authorized for communication with devices outside the network.

U.S. Pat. No. 6,279,113, issued to Vaidya discloses a signature based dynamic network intrusion detection system (IDS) includes attack signature profiles which are descriptive of characteristics of known network security violations. The attack signature profiles are organized into sets of attack signature profiles according to security requirements of network objects on a network. Each network object is assigned a set of attack signature profiles which is stored in a signature profile memory together with association data indicative of which sets of attack signature profiles correspond to which network objects. A monitoring device monitors network traffic for data addressed to the network objects. Upon detecting a data packet addressed to one of the network objects, packet information is extracted from the data packet. The extracted information is utilized to obtain a set of attack signature profiles corresponding to the network object based on the association data. A virtual processor executes instructions associated with attack signature profiles to determine if the packet is associated with a known network security violation. An attack signature profile generator is utilized to generate additional attack signature profiles configured for processing by the virtual processor in the absence of any corresponding modification of the virtual processor.

U.S. Pat. No. 6,088,804 issued to Hill et al. describes a dynamic network security system that responds to security attacks on a computer network having a multiplicity of computer nodes. The security system includes a plurality of security agents that concurrently detect occurrences of security events on associated computer nodes. A processor processes the security events that are received from the security agents to form an attack signature of the attack. A network status display displays multi-dimensional attack status information representing the attack in a two dimensional image to indicate the overall nature and severity of the attack. The network status display also includes a list of recommended actions for mitigating the attack. The security system is adapted to respond to a subsequent attack that has a subsequent signature most closely resembling the attack signature.

U.S. Pat. No. 6,301,668 to Gleichauf et al. discloses a method and system for adaptive network security using network vulnerability assessment. The method comprises directing a request onto a network. A response to the request is assessed to discover network information. A plurality of analysis tasks are prioritized based upon the network information. The plurality of analysis tasks are to be performed on monitored network data traffic in order to identify attacks upon the network.

United States Patent Application Publication No. 2002/0165957 to Devoe et al. discloses a method for building a network route map in which network operational characteristics are gathered by actively probing multiple network routes, and building the network route map based on the operational characteristics. Route maps are generated which provide a view of the network from the perspective of a particular routing device in the network. Embodiments include methods for gathering the operational data by transmitting one or more data packets, receiving responses thereto, and determining time differentials based on the responses. Other embodiments include methods for processing the operational data to determine various metrics, and normalizing the data with similar data gathered from other network route probes. Finally, additional embodiments include propagation of the preferred route information to multiple routing devices to provide intelligent route selection thereto.

United States Patent Application Publication No. 2003/0097439 to Strayer et al. discloses a traffic auditor (130) analyzes traffic in a communications network (100). The traffic auditor (130) performs traffic analysis on traffic in the communications network (100) and develops a model of expected traffic behavior based on the traffic analysis. The traffic auditor (130) analyzes traffic in the communications network (100) to identify a deviation from the expected traffic behavior model. This invention requires the interposition of collection agents within the network to collect traffic data. It does not depend upon traffic reports from any locations. Compare FIG. 1 of the instant invention with FIG. 2 of the '439 publication.

In fact, the Strayer invention is complex: its devices must be properly placed and connected to the network; and its steps must be performed in specific sequence for it to work.

The process is described in FIGS. 7A-15 and paragraphs [0105]-[0123]. The Strayer process starts with mathematical traffic analysis and includes complex data encoding and analysis. See paragraphs [0041]-[0104]. This process continues with, inter alia, filtering out of expected traffic and querying of anomalous traffic. In contrast, the instant invention includes no complicated calculations and simply places information in a look up table for use later on, if desired.

U.S. Pat. No. 7,814,546 to Strayer, et al. discloses a system and method for determining the point of entry of a malicious packet into a network. An intrusion detection system detects entry of the malicious packet into the network (500). A stepping stone detection system identifies stepping stones in extended connections within the network (524). A trace back engine isolates the malicious packet in response to operation of the intrusion detection system (528), wherein the trace back engine utilizes the identified stepping stones to determine the point of entry of the malicious packet.

This patent allows for installation of Data Generation Agents (DGA 410) on each router (405). The DGA (410) produces packet digests of each packet as they are forwarded through the router (405) and stores the digests in time-stamped digest tables. The tables are paged or refreshed every so often, and represent the set of traffic forwarded by the router for a particular interval of time. Each table is annotated with the time interval and the set of hash functions used to compute the packet digests over that interval. The digest tables are stored locally at the DGA (410) for some period of time, depending on the resource constraints of the router. Strayer's invention traces a packet from the end point in a network, and traces that packet back through the path it took one hop at a time to get to the origin. The present invention does not require DGAs at all routers. In the present invention, cooperating routers could be few in number and sparsely distributed through a large network, and the method would still compute a set of possible origin addresses.

Strayer's invention actually traces back traffic for a short time after the packet is seen. Accordingly, DGAs maintain logs that might be thrown away quickly. In the present invention, cooperating nodes in the network maintain packet digests for arbitrarily long. In addition, installation of DGAs (410) on a router does not mean "cooperating". A malicious person could install a DGA (410) on his router as well —meaning the traceback system could be badly misled by trusting data from that router. In the present invention, "cooperating" routers are trusted to maintain valid and accurate packet digests for arbitrarily long periods of time.

United States Patent Application Publication No. 2003/0115485 to Milliken discloses a system (126-129) for detecting transmission of potentially malicious packets. The system (126-129) receives packets and generates hash values corresponding to each of the packets. The system (126-129) may then compare the generated hash values to hash values corresponding to prior packets. The system (126-129) determines that one of the packets is a potentially malicious packet when the generated hash value corresponding to the one packet matches one of the hash values corresponding to one of the prior packets and the one prior packet was received within a predetermined amount of time of the one packet. The system (126-129) may also facilitate the tracing of the path taken by a potentially malicious packet. In this case, the system (126-129) may receive a message that identifies a potentially malicious packet, generate hash values from the potentially malicious packet, and determine whether one or more of the generated hash values match hash values corresponding to previously-received packets. The system (126-129) may then identify the potentially malicious packet as one of the previously-received packets when one or more of the generated hash values match the hash value corresponding to the one previously-received packet.

U.S. Pat. No. 7,814,546 discloses a system and method for determining the point of entry of a malicious packet into a network is disclosed. An intrusion detection system detects entry of the malicious packet into the network (500). A stepping stone detection system identifies stepping stones in extended connections within the network (524). A trace back engine isolates the malicious packet in response to operation of the intrusion detection system (528), wherein the trace back engine utilizes the identified stepping stones to determine the point of entry of the malicious packet.

U.S. Pat. No. 6,981,158 to Sanchez discloses system and method for performing source path isolation in a network. The system comprises an intrusion detection system (IDS), a source path isolation server (SS1) and at least one router configured to operate as a source path isolation router (SR1) operating within an autonomous system. When IDS detects a malicious packet, a message is sent to SS1. SS1 in turn generates a query message (QM) containing at least a portion of the malicious packet. Then, QM is sent to participating routers located one hop away. SR1 uses the query message to determine if it has observed the malicious packet by comparing it with locally stored information about packets having passed through SR1. SR1 sends a reply to SS1, and SS1 uses the reply to identify the ingress point into the network of the malicious packet. Sanchez does not teach a plurality of non-cooperating locations on the network. On FIG. 4, the Node Response column for Nodes 03 and n is in response to the question shown at 410, namely, "Did SR see Target Packet? Either possible response requires a cooperating network element.

The primary objective of the present invention is to provide a system that will allow users to identify the source of an identified data packet or packet stream at any point in time. In this way, a source of unwanted packets that are potentially harmful to a given destination may be prevented from sending the unwanted packets or the packet stream avoided. A secondary objective is to develop the system as a service utility that can utilize information obtained from a cooperating community to broaden and strengthen the integrity of the network in which it operates and to make it more difficult for untrusted sources to send unwanted data packets to destination sites. A further objective is to provide these capabilities and services without requiring modifications to existing router hardware.

SUMMARY OF THE INVENTION

The present invention addresses many of the deficiencies of prior packet source identification systems and satisfies all of the objectives described above.

(1) A system for identifying a set of potential origins of Internet Protocol data packets on a network includes a plurality of cooperating network locations. The cooperating locations provide information as to whether an identified data packet did or did not pass through the location at an identified point in time. A link signature is provided for each of the identified data packets. The link signature is developed from information provided by the cooperating locations and includes a series of first predetermined values for each cooperating location through which the packet did pass and a series of second predetermined values for each cooperating location through which the packet did not pass. A table of origins is provided. The table includes identified destination locations, unions of all link signatures matching data packet information available for the identified data packet and origin locations consistent with the link signatures. When a system user supplies a destination location and data packet information regarding an identified data packet, the system will identify the set of possible origins for the data packet.

(2) In a variant of the invention, the system includes a system for dividing locations into blocks. The blocks include locations that have identical link signatures for routing a packet to any location from another identified block at the identified point in time. A reverse routing table is provided. The table includes link signatures identifying at least one valid routing between selected locations in each destination/source pair of blocks in the network for the identified point in time. When the locations in the network are divided into the blocks, the set of possible origins of identified packets may be more easily determined for very large networks.

(3) In another variant, the table of origins includes blocks having identified destination locations within them, unions of all link signatures matching data packet information available for the identified data packet and origin locations consistent with the link signatures in the reverse routing table.

(4) In still another variant, the cooperating network locations include incoming links to routers or switches on the network.

(5) In yet another variant, the first predetermined values are either of "1" and "true" and the second predetermined values are either of "0" and "false."

(6) In a further variant, the link signature for each identified data packet is gathered and maintained over a period of time, thereby permitting historical inquiries of the system.

(7) In still a further variant, the link signatures identifying all possible valid routings between a selected cooperating location in each destination/source pair of blocks in the network for the reverse routing table are gathered using a system that includes an identified destination location in each block, an identified responding source location in each block and a probe packet sent to responding locations in each of the source blocks. The probe packet causes the source blocks to send an identifiable response packet to each of the destination locations in the destination blocks. A link signature for each destination/source pair of locations is derived from information returned by the identifiable response to the probe packet. An assignment is made of each of the derived link signatures as link signatures indicating valid routing to all destination locations within the block from all potential source locations within any other block. The link signature derived from the identifiable response to the probe packet is recognized as is one of those that could be observed for packets forwarded from the given source block to the given destination block at a given point in time.

(8) In yet a further variant, the link signatures in the reverse routing table are gathered and maintained over a period of time, thereby permitting historical inquiries of the table.

(9) In another variant, definitions of the blocks are updated as new link signature information related to locations within the blocks is received, thereby maintaining the blocks as groups of locations having identical link signatures for routing a packet to an identified location at the identified point in time.

(10) In still another variant, tools are provided for collecting and storing information at cooperating locations related to data packets passing through the cooperating locations over identified periods of time. The information includes at least link signature and routing information related to the packets, thereby providing further means for identifying potential origins for data packets based upon partial packet information.

(11) A method for identifying a set of potential origins of Internet Protocol data packets on a network includes the following steps:

1. Identifying a plurality of cooperating network locations. The cooperating locations provide information as to whether an identified data packet did or did not pass through the cooperating location at an identified point in time.
2. Creating a link signature for each of the identified data packets. The link signatures are developed from information provided by the cooperating locations and include a series of first predetermined values for each cooperating location through which the packet did pass and a series of second predetermined values for each cooperating location through which the packet did not pass.

3. Developing a table of origins. The table includes identified destination locations, unions of all link signatures matching data packet information available for the identified data packets and origin locations consistent with the link signatures. When a system user supplies a destination location and data packet information regarding an identified data packet, the system will identify the set of possible origins for the data packet.

(12) A variant of the invention includes the further steps of dividing locations into blocks. The blocks comprise locations that have identical link signatures for routing a packet to any location from another identified block at the identified point in time and creating a reverse routing table. The table includes link signatures identifying at least one valid routing between selected locations in each destination/source pair of blocks in the network for the identified point in time. When the locations in the network are divided into the blocks, the set of possible origins of identified packets may be more easily determined for very large networks.

(13) Another variant includes the step of developing a table of origins which comprises blocks having identified destination locations within them, unions of all link signatures matching data packet information available for the identified data packet and origin locations consistent with the link signatures in the reverse routing table.

(14) In yet another variant, the cooperating network locations comprise incoming links to routers or switches on the network.

(15) In still another variant, the first predetermined values are either of "1" and "true" and the second predetermined values are either of "0" and "false."

(16) A further variant includes the further step of gathering and maintaining the link signature for each identified data packet over a period of time, thereby permitting historical inquiries of the system.

(17) Still a further variant, the method of developing link signatures identifying all possible valid routes between a selected cooperating location in each destination/source pair of blocks in the network for the reverse routing table includes the further steps of: identifying a destination location in each block; identifying a responding source location in each block; sending a probe packet to responding locations in each of the source blocks causing the source blocks to send an identifiable response packet to each of the destination locations in the destination blocks; creating a link signature for each for each destination/source pair of locations derived from information returned by the identifiable response to the probe packet; making an assignment of each the derived link signature as link signatures indicating valid routing for all destination locations within the block to all potential source locations within any other block. The link signature derived from the identifiable response to the probe packet is recognized as is one of those that could be observed for packets forwarded from the given source block to the given destination block at a given point in time.

(18) Yet a further variant of the invention includes the further steps of gathering and maintaining the link signatures in the reverse routing table over a period of time, thereby permitting historical inquiries of the table.

(19) Another variant of the method includes the further step of updating definitions of the blocks as new link signature information related to cooperating locations within the blocks is received, thereby maintaining the blocks as groups of locations having identical link signatures for routing a packet to an identified location at the identified point in time.

(20) A final variant of the method includes the further step of collecting and storing information at cooperating locations related to data packets passing through the cooperating locations over identified periods of time, the information includes at least link signature and routing information related to the packets, thereby providing further means for identifying potential origins for data packets based upon partial packet information.

An appreciation of the other aims and objectives of the present invention and an understanding of it may be achieved by referring to the accompanying drawings and the detailed description of a preferred embodiment.

DESCRIPTION OF THE DRAWINGS

FIG. 2 is a table illustrating link signatures for identified data packets derived from cooperating locations;

FIG. 3 is a table of origins for various destinations and link signatures for valid routings between them found for identified packets;

FIG. 4 is a table of origins for blocks of network locations illustrating link signatures for valid routings between destination and origin blocks found for identified packets;

FIG. 5 is a reverse routing table illustrating link signatures for valid routings between destination blocks and source blocks within the network.

DETAILED DESCRIPTION OF THE PREFERRED EMBODIMENT

Figure 1:
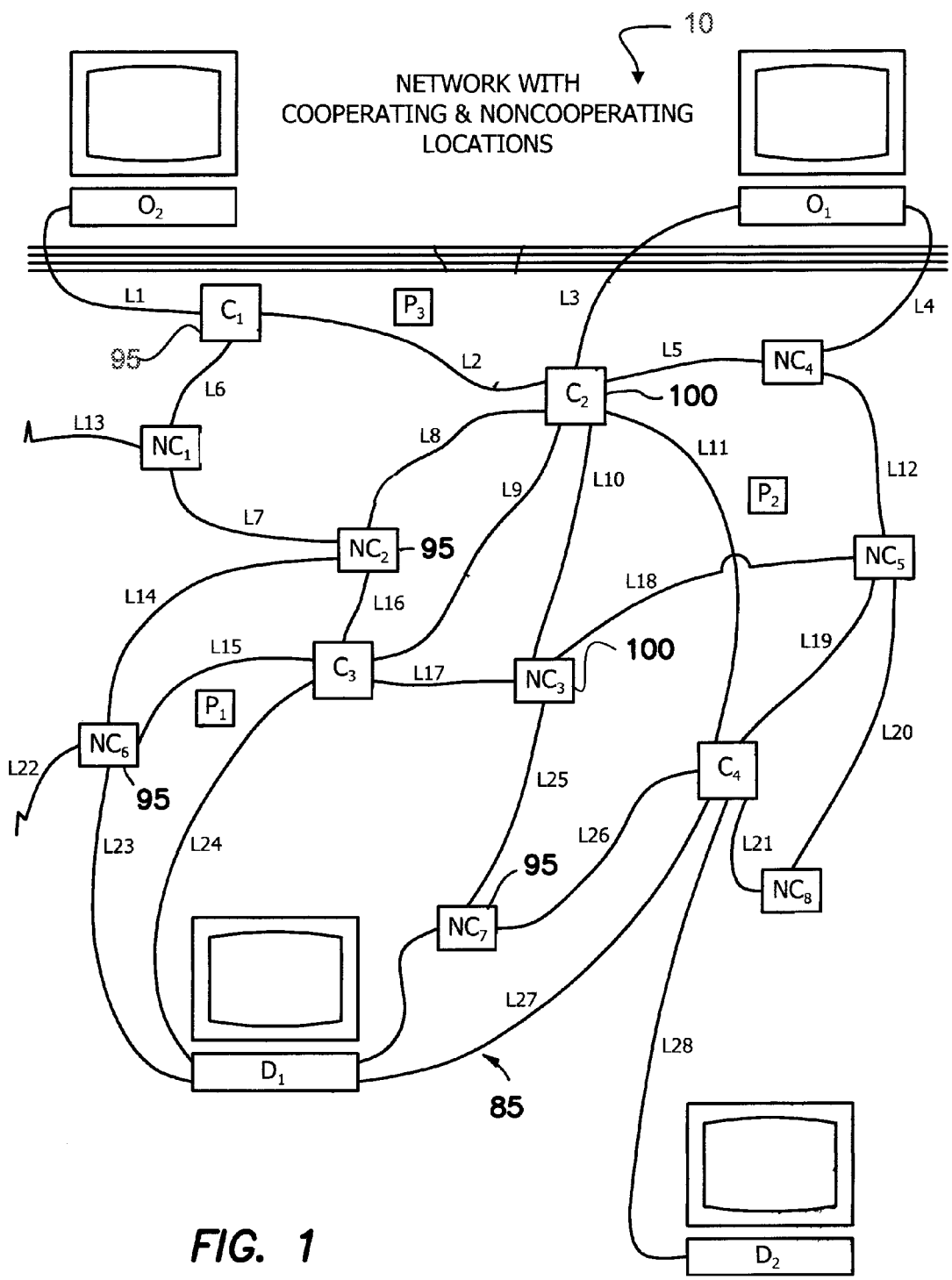
FIG. 1 is a schematic view of a first embodiment of the invention illustrating a network comprising origin and destination locations, cooperating and non-cooperating network locations, identified packets and network links.

FIGS. 1-6 illustrate a system 10 for identifying a set of potential originating computers O of internet protocol data packets P on a network 85. The network 85 contains a plurality of cooperating network locations C and non-cooperating locations NC. Both types of locations C, NC are on, and active in the network. In other words they both are transmitting packets P through the network 85 links L. Upon being queried by this invention 10, the cooperating locations C provide information as to whether an identified data packet P did or did not pass through the location C at an identified point in time. The non-cooperating locations NC do not provide information as to whether an identified data packet P did or did not pass through the location NC at an identified point in time. A link signature 25 is determined from the responses of each cooperating location C. As illustrated in FIG. 2, the link signature for each packet P is developed from information provided by the cooperating locations C and includes a series of first predetermined values 30 for each cooperating location C through which the packet P did pass and a series of second predetermined values 35 for each cooperating location C through which the packet P did not pass. For example, the first predetermined values 30 could be 1's or X's and the second predetermined values 35 could be 0's or O's. In the first exemplary case the link signature 25 would be a string of numbers of the form 1010 . . . 001 and in the second exemplary case the link signature 25 would be a string of letters of the form XOXO . . . XXX.

As illustrated in FIG. 3, a table of origins 40 is calculated from the link signatures 25. The table 40 includes identified destination locations D, unions 50 of all link signatures 25 matching data packet information available for the identified data packet P and origin locations O consistent with the link signatures 25. When a system user supplies a destination location computer D and a specific packet P, the system 10 will identify the set of possible origins O for the data packet P.

Figures 6, 7:
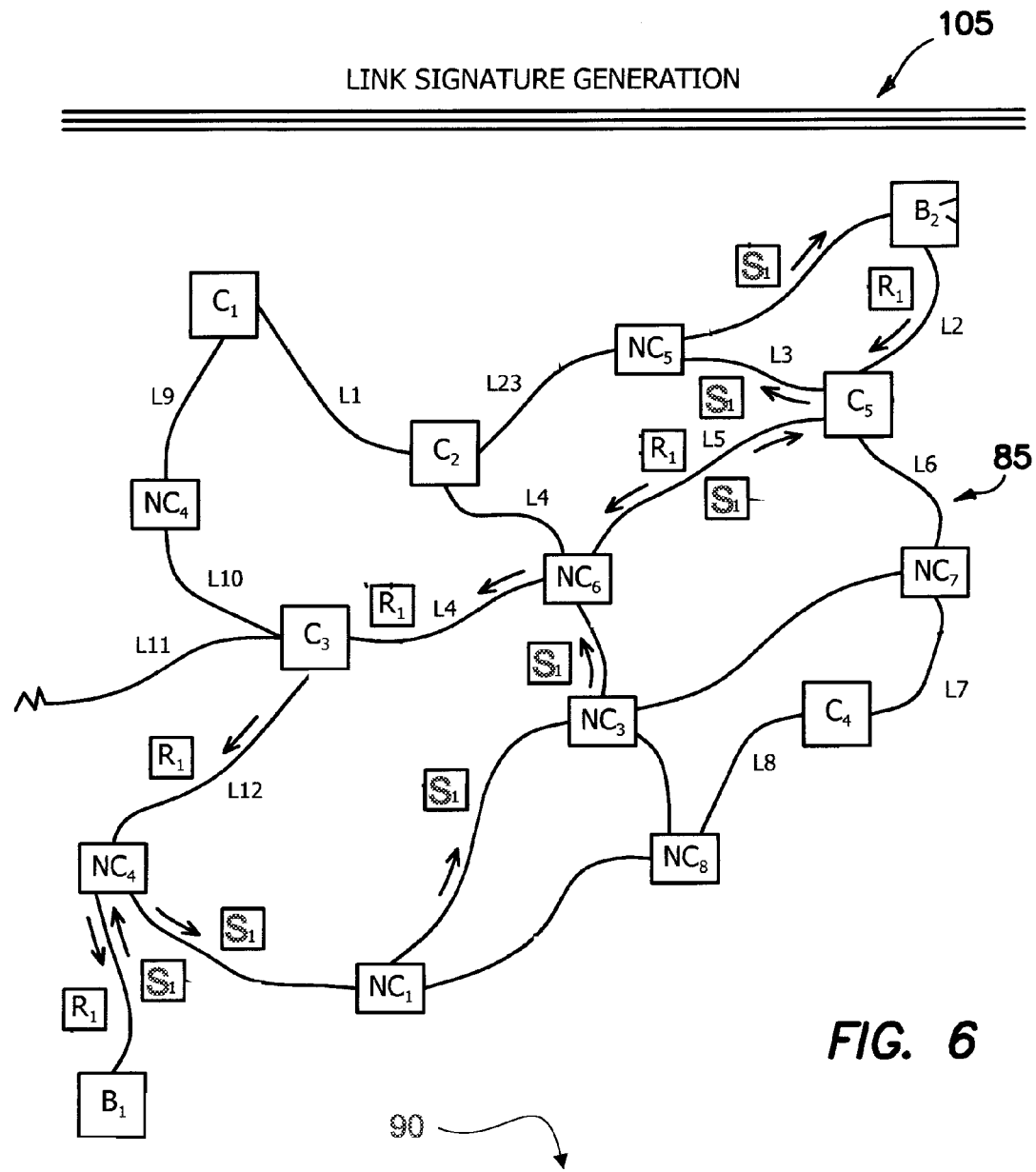
FIG. 6 is a schematic view of a system for link signature generation using probe packets sent through cooperating and non-cooperating network locations and response packets returning a valid routing from the possible origin location back to the destination location.
FIG. 7 is a reverse routing table by block

In a variant of the invention, as illustrated in FIGS. 4 and 6, the system 10 includes a sub-system 60 for dividing locations C, NC into blocks B. The blocks B include locations C that have identical link signatures 25 for routing a packet P to any location C from another identified block B at the identified point in time. As illustrated in FIG. 5, a reverse routing table 75 is calculated. The table 75 includes link signatures 25 identifying at least one valid routing 80 between selected locations C in each destination/source pair of blocks B in the network 85 for the identified point in time. When the locations C, NC in the network 85 are divided into the blocks B, the set of possible origins or source locations O of identified packets P may be more easily determined for very large networks 85.

In another variant, as illustrated in FIG. 4, the table of origins 40 includes blocks B having identified destination locations D within them, unions 50 of all link signatures L matching data packet information available for the identified data packet P and origin locations O consistent with the link signatures L in the reverse routing table 75.

In still another variant, as illustrated in FIG. 1, the cooperating network locations C include routers 95 or switches 100.

In yet another variant, as illustrated in FIGS. 2-5, the first predetermined values 30 are either of "1" and "true" and the second predetermined values 35 are either of "0" and "false."

In a further variant, the link signature 25 for each identified data packet P is gathered and maintained over a period of time, thereby permitting historical inquiries of the system.

In still a further variant, as illustrated in FIG. 6, the link signatures 25 identifying all possible valid routings 80 between a selected cooperating location C in each destination/source pair of blocks B in the network 85 for the reverse routing table 75 are gathered using a sub-system 105 that includes an identified destination location D in each block B, an identified responding source location O in each block B and a probe packet S sent to responding locations O in each of the source blocks B. The probe packet S causes the source blocks B to send an identifiable response packet R to each of the destination locations D in the destination blocks B. A link signature 25 for each destination/source pair of locations C is derived from information returned by the identifiable response R to the probe packet S. An assignment is made of each of the derived link signatures 25 as link signatures 25 indicating valid routing 80 to all destination locations D within the block B from all potential source locations O within any other block B. The link signature 25 derived from the identifiable response R to the probe packet S is recognized as is one of those that could be observed for packets P forwarded from the given source block B to the given destination block B at a given point in time.

In yet a further variant, as illustrated in FIG. 5, the link signatures 25 in the reverse routing table 75 are gathered and maintained over a period of time, thereby permitting historical inquiries of the table.

In another variant, as illustrated in FIG. 4, definitions of the blocks B are updated as new link signature 25 information related to locations C within the blocks B is received, thereby maintaining the blocks B as groups of locations C having identical link signatures L for routing a packet P to an identified location C at the identified point in time.

In still another variant, tools (not shown) are provided for collecting and storing information at cooperating locations C related to data packets P passing through the cooperating locations C over identified periods of time. The information includes at least link signature 25 and routing information related to the packets P, thereby providing further means for identifying potential origins O for data packets P based upon packet information.

FIGS. 1-6 illustrate a method for identifying a set of potential origins or source locations O of Internet Protocol data packets P on a network 85 including the following steps:
1. Identifying a plurality of cooperating network locations C. The cooperating locations C provide information as to whether an identified data packet P did or did not pass through the cooperating location C at an identified point in time.
2. Creating a link signature 25 for each of the identified data packets P. As illustrated in FIG. 2, the link signatures 25 are developed from information provided by the cooperating locations C and include a series of first predetermined values 30 for each cooperating location C through which the packet P did pass and a series of second predetermined values 35 for each cooperating location C through which the packet P did not pass.
3. Developing a table of origins 40, as illustrated in FIG. 3. The table 40 includes identified destination locations D, unions 50 of all link signatures 25 matching data packet information available for the identified data packets P and origin locations O consistent with the link signatures 25. When a system user supplies a destination location D and data packet information regarding an identified data packet P, the system 10 will identify the set of possible origins O for the data packet P.

A variant of the invention, as illustrated in FIG. 4, includes the further steps of dividing locations C, NC into blocks B. The blocks B comprise locations C that have identical link signatures 25 for routing a packet P to any location C from another identified block B at the identified point in time. From this information, the invention creates a reverse routing table 75 as illustrated in FIG. 5. The table 75 includes link signatures 25 identifying at least one valid routing 80 between selected locations C, NC in each destination/source pair of blocks B in the network 85 for the identified point in time. When the locations C, NC in the network 85 are divided into the blocks B, the set of possible origins O of identified packets P may be more easily determined for very large networks 85.

Another variant, as illustrated in FIG. 4, includes the step of developing a table of origins 40 which comprises blocks B having identified destination locations D within them, unions 50 of all link signatures L matching data packet information available for the identified data packet P and origin locations O consistent with the link signatures L in the reverse routing table 75.

In yet another variant, as illustrated in FIG. 1, the cooperating network locations C comprise routers 95 or switches 100.

In still another variant, as illustrated in FIGS. 2-5, the first predetermined values 30 are either of "1" and "true" and the second predetermined values 35 are either of "0" and "false."

A further variant includes the further step of gathering and maintaining the link signature 25 for each identified data packet P over a period of time, thereby permitting historical inquiries of the system.

In still a further variant, as illustrated in FIG. 6, the method of developing link signatures 25 identifying all possible valid routings 80 between a selected cooperating location C in each destination/source pair of blocks B in the network 85 for the reverse routing table 90 (see FIG. 7) includes the further steps of: identifying a destination location D in each block B; identifying a responding source location O in each block B; sending a probe packet S to responding locations O in each of the source blocks B; causing the source blocks B to send an identifiable response packet R to each of the destination locations D in the destination blocks B; creating a link signature 25 for each for each destination/source pair of locations C derived from information returned by the identifiable response R to the probe packet S; making an assignment 125 of each the derived link signatures 25 as link signatures 25 indicating valid routing 80 for all destination locations D within the block B to all potential source locations O within any other block B. The link signature 25 derived from the identifiable response R to the probe packet S is recognized as is one of those that could be observed for packets P forwarded from the given source block B to the given destination block B at a given point in time.

Yet a further variant of the invention, as illustrated in FIG. 5, includes the further steps of gathering and maintaining the link signatures L in the reverse routing table 75 over a period of time, thereby permitting historical inquiries of the table.

Another variant of the method, as illustrated in FIG. 4, includes the further step of updating definitions of the blocks B as new link signature 25 information related to cooperating locations C within the blocks B is received, thereby maintaining the blocks B as groups of locations C having identical link signatures L for routing a packet P to an identified location C at the identified point in time.

A final variant of the method 10 includes the further step of collecting and storing information at cooperating locations C related to data packets P passing through the cooperating locations C over identified periods of time. The information includes at least link signature 25 and routing information related to the packets P, thereby providing further means for identifying potential origins O for data packets P based upon partial packet information.

This invention is a software program that is run on a computer. FIGS. 2, 3, 4, 5 and 7 are tables. A table is an arrangement of words, numbers, or signs, or combinations of them, in parallel columns, to exhibit a set of facts or relations in a definite, compact, and comprehensive form. The intersections of the rows and columns of a table are called cells. A table has values or lack of a value in all cells. FIGS. 2, 3, 4, 5 and 7 should not be confused with graphs. A graph is a diagram representing a system of connections or interrelations among two or three variables. The axes of a graph represent values of the variables. The body of the graph contains a number of distinctive dots, lines, bars, etc. which connect the values on each axis.

In the present invention 10, a cooperating network location C is one that not only supplies data, but an element that supplies data that can be relied upon in determining a network path. A non-cooperating network element NC is an element that either does not respond to queries or one that may provide false data. The present invention 10 is focused on the totality of the Internet, rather than some small and well controlled network environment. As such, the present invention 10 considers the Internet environment to be potentially hostile unless proven otherwise. For this reason, it relies only upon trusted data originating at known cooperating network locations C. This notion of cooperating network elements and the resulting reliable data is a key difference between the present invention and the prior art.

There is a trust component to cooperating locations C in this invention 10. This invention is based on identifying even a few, sparsely distributed, trusted locations C on the Internet that are known to keep careful packet logs and will answer questions truthfully about whether packets P with certain properties traversed them at specific points in time.

It is immaterial for this invention how these packet logs are kept, so long as they will answer data link related queries accurately. Cooperating locations C may have DGA's. But, non-cooperating locations NC may have DGA's, too. Simply having a DGA does not imply that the location is a cooperating one. The only criterion for whether a location is cooperating or not is whether it will truthfully report whether certain packets P have passed through them at specific points in time.

The instant invention 10 allows for long term maintenance of logs and packet digests at the cooperating locations C for arbitrarily long periods. The invention 10 queries cooperating locations C for source addresses for a packet P with certain properties. Each location C will then look up its log to see if a packet P with those properties traversed that link and answer "yes" or "no". Finally, the invention computes the link signature 25 from these responses.

Therefore the instant invention 10 can be used in forensic situations, long after some activity is noticed. In contrast the Strayer invention is used for automatic trace back in real-time back along the path where the packet came from. The instant invention 10 is far more powerful, since it can be used when you notice a network intrusion weeks after it happened and need to investigate.

The following reference numerals are used on FIGS. 1-6:
10 system according to the present invention
25 link signature
30 first predetermined value
35 second predetermined value
40 table of origins
50 union of link signatures
60 subsystem for dividing locations into blocks
75 reverse routing table
80 valid routing
85 network
90 reverse routing table by block
95 router
100 switch
105 sub system that includes an identified location in each block
C cooperating location
NC non-cooperating location
L links
P internet protocol data packet
O potential origin of internet protocol data packet n
D destination location
S probe packet
R response packet
B blocks having identical link signatures The system for finding potential origins of spoofed Internet Protocol attack traffic 10 has been described with reference to particular embodiments. Other modifications and enhancements can be made without departing from the spirit and scope of the claims that follow.

The invention claimed is:

1. A system for identifying a set of potential origins of Internet Protocol data packets on a network by a computer, said system comprising:
 a plurality of cooperating locations on said network, said cooperating locations providing accurate and reliable information as to whether an identified data packet did or did not pass through said cooperating locations at an identified point in time;
 a plurality of non-cooperating locations on said network, said non-cooperating locations receiving and transmitting data packets yet providing no or false information as to whether said identified data packet did or did not pass through said non-cooperating locations at said identified point in time;

a means for querying each of said cooperating locations as to whether said identified data packet did or did not pass through said cooperating locations at said identified point in time;

a response from each of said cooperating locations;

each response being a first predetermined value if said identified data packet did pass through said cooperating locations at said identified point in time;

each response being a second predetermined value if said identified data packet did not pass through said cooperating locations at said identified point in time; said first predetermined value being different from said second predetermined value;

a link signature for each of said identified data packets; said link signature comprising a string of digits including a plurality of said first predetermined values and a plurality of said second predetermined values;

a table of origins, said table of origins comprising identified destination locations, unions of all link signatures matching data packet information available for said identified data packet and origin locations consistent with said link signatures;

a sub-system for dividing said locations into blocks, where such blocks comprise said cooperating locations that have identical link signatures for routing the identified data packet to any location from another identified block at said identified point in time; and a reverse routing table, said table reverse routing table comprising link signatures identifying at least one valid routing between selected locations in each destination/source pair of blocks in said network for said identified point in time; and a means for said system to identify the set of possible origins for an identified data packet when a system user supplies a destination location and data packet information for said identified data packet.

2. The system as described in claim 1, wherein said table of origins comprises blocks having identified destination locations within them, unions of all link signatures matching data packet information available for said identified data packet and origin locations consistent with said link signatures in said reverse routing table.

3. The system as described in claim 1, wherein said cooperating locations comprise routers or switches on said network.

4. The system as described in claim 1, wherein said link signature for said identified data packet is gathered and maintained over a period of time, thereby permitting historical inquiries of said system.

5. The system as described in claim 1, wherein said link signatures identifying all possible valid routings between a selected cooperating location in each destination/source pair of blocks in said network for said reverse routing table are gathered further comprising:

an identified destination location in each block;

an identified responding source location in each block;

a probe packet; said probe packet causing said source location to send an identifiable response packet to said destination location;

a means for deriving derived link signatures for each destination/source pair of locations from information returned by said identifiable response;

a means for assigning said derived link signatures as link signatures indicating valid routing to all destination locations within said block from all potential source locations within any other block; and said link signature derived from said identifiable response to said probe packet being recognized as being one of those that could be observed for packets forwarded from said given source block to said given destination block at a given point in time.

6. The system as described in claim 1, wherein said link signature in said reverse routing table are gathered and maintained over a period of time, thereby permitting historical inquiries of said reverse routing table.

7. The system as described in claim 1, wherein definitions of said blocks are updated as new link signature information related to locations within said blocks is received, thereby maintaining said blocks as groups of locations having identical link signatures for routing a packet to an identified location at said identified point in time.

8. The system as described in claim 1, further comprising tools for collecting and storing information at cooperating locations related to data packets passing through said cooperating locations over identified periods of time, said information comprising at least link signature and routing information related to said packets, thereby providing further means for identifying potential origins for data packets based upon partial packet information.

9. A method for identifying a set of potential origins of Internet Protocol data packets on a network having cooperating locations and non-cooperating locations, by a computer said method comprising the steps of:

identifying a plurality of cooperating locations and non-cooperating locations in said network, said cooperating locations providing accurate and reliable information as to whether an identified data packet did or did not pass through each cooperating location at an identified point in time; said non-cooperating locations receiving and transmitting data packets yet providing no or false information as to whether said identified data packet did or did not pass through each non-cooperating location at said identified point in time;

querying each of said cooperating locations as to whether said identified data packet did or did not pass through said cooperating locations at an identified point in time;

receiving a response from each of said cooperating locations;

each response being a first predetermined value if said identified data packet did pass through said cooperating locations at said identified point in time;

each said response being a second predetermined value if said identified data packet did not pass through said cooperating locations at said identified point in time; said first predetermined value being different from said second predetermined value;

creating a link signature for each of said identified data packets, said link signature comprising a string of digits including a plurality of said first predetermined values and a plurality of said second predetermined values;

developing a table of origins from said link signatures, said table of origins comprising identified destination locations, unions of all link signatures matching data packet information available for said identified data packets and origin locations consistent with said link signatures;

dividing said locations into blocks, where such blocks comprise locations that have identical link signatures for routing a packet to any location from another identified block at said identified point in time;

creating a reverse routing table, said reverse routing table comprising link signatures identifying at least one valid routing between selected locations in each destination/source pair of blocks in said network for said identified point in time;

allowing a system user to supply a destination location and data packet information regarding an identified data packet; and performing computations to identify said set of possible origins for said identified data packet.

10. The method as described in claim 9, comprising the further step of:

developing a table of origins wherein said table of origins comprises blocks having identified destination locations within them, unions of all link signatures matching data packet information available for said identified data packet and origin locations consistent with said link signatures in said reverse routing table.

11. The method as described in claim 9, wherein said cooperating locations comprise routers or switches on said network.

12. The method as described in claim 9, further comprising the step of gathering and maintaining said link signature for said identified data packet over a period of time on said computer, thereby permitting historical inquiries of said system.

13. The method as described in claim 9, wherein said method of developing link signatures identifying all possible valid routings between a selected cooperating location in each destination/source pair of blocks in said network for said reverse routing table further comprising the steps of:

identifying a destination location in each block;
identifying a responding source location in each block;
sending a probe packet to said source location;
said probe packet causing said source location to send an identifiable response packet to said destination location;
deriving derived link signatures for each destination/source pair of locations from information returned by said identifiable response;
making an assignment of said derived link signatures as link signatures indicating valid routing for all destination locations within said block to all potential source locations within any other block; and
recognizing said link signature derived from said identifiable response to said probe packet as being one of those that could be observed for packets forwarded from said given source block to said given destination block at a given point in time.

14. The method as described in claim 9, further comprising the steps of:

gathering and maintaining said link signatures in said reverse routing table over a period of time; and thereby permitting historical inquiries of said reverse routing table.

15. The method as described in claim 9, further comprising the step of updating definitions of said blocks as new link signature information related to cooperating locations within said blocks is received, thereby maintaining said blocks as groups of locations having identical link signatures for routing a packet to an identified location at said identified point in time.

16. The method as described in claim 9, further comprising the step of collecting and storing information at cooperating locations related to data packets passing through said cooperating locations over identified periods of time, said information comprising at least link signature and routing information related to said packets, thereby providing further means for identifying potential origins for data packets based upon partial packet information.

* * * * *